US011986831B2

(12) United States Patent
Richards et al.

(10) Patent No.: US 11,986,831 B2
(45) Date of Patent: May 21, 2024

(54) SAMPLE PROCESSING ASSEMBLY

(71) Applicant: LEICA BIOSYSTEMS MELBOURNE PTY LTD, Mount Waverley (AU)

(72) Inventors: Campbell Richards, Mount Waverly (AU); Matthew Struan King, Glen Iris (AU); Cyril Lim, Malvern East (AU)

(73) Assignee: LEICA BIOSYSTEMS MELBOURNE PTY LTD, Mount Waverley (AU)

( * ) Notice: Subject to any disclaimer, the term of this patent is extended or adjusted under 35 U.S.C. 154(b) by 0 days.

(21) Appl. No.: 16/620,303

(22) PCT Filed: Aug. 17, 2018

(86) PCT No.: PCT/AU2018/050875
§ 371 (c)(1),
(2) Date: Dec. 6, 2019

(87) PCT Pub. No.: WO2019/033172
PCT Pub. Date: Feb. 21, 2019

(65) Prior Publication Data
US 2020/0188924 A1 Jun. 18, 2020

(30) Foreign Application Priority Data
Aug. 17, 2017 (AU) .............................. 2017903307

(51) Int. Cl.
*B01L 9/00* (2006.01)
*G01N 1/31* (2006.01)
*G01N 1/44* (2006.01)

(52) U.S. Cl.
CPC ............... *B01L 9/52* (2013.01); *G01N 1/312* (2013.01); *G01N 1/44* (2013.01);
(Continued)

(58) Field of Classification Search
CPC ................. B01L 9/52; B01L 2300/043; B01L 2300/0877; B01L 2300/1805; G01N 1/312; G01N 1/44
See application file for complete search history.

(56) References Cited

U.S. PATENT DOCUMENTS 5,346,672 A 9/1994 Stapleton et al.
6,302,985 B1 * 10/2001 Takahashi .............. G01N 1/312
156/99
(Continued)

FOREIGN PATENT DOCUMENTS

CN 104884931 A 9/2015
JP 2013-545981 A 12/2013
WO 2012/064873 A1 5/2012

OTHER PUBLICATIONS

Communication dated Mar. 27, 2020, from the European Patent Office in European Application No. 18846726.0.
(Continued)

*Primary Examiner* — Matthew D Krcha
*Assistant Examiner* — Tingchen Shi
(74) *Attorney, Agent, or Firm* — Sughrue Mion, PLLC

(57) ABSTRACT

A sample processing assembly for treatment of a sample on a substrate, the assembly including: a mounting surface for the substrate; and a cover member, the cover member being movable between an open position and a substantially closed position, wherein, when the substrate is placed in the assembly and the cover member is in the substantially closed position, a reaction chamber is formed for processing the sample between the cover member and the substrate, and wherein the mounting surface provides for an air gap between the substrate and the mounting surface. An instrument for treatment of a sample on a substrate including at least one sample processing assembly as provided herein. A
(Continued)

method of placing a substrate in a sample processing assembly is also provided.

11 Claims, 3 Drawing Sheets

(52) U.S. Cl.
CPC . *B01L 2300/043* (2013.01); *B01L 2300/0877* (2013.01); *B01L 2300/1805* (2013.01)

(56) References Cited

U.S. PATENT DOCUMENTS

| | | | |
|---|---|---|---|
| 6,759,011 B1 | 7/2004 | Richards et al. | |
| 2003/0138353 A1 | 7/2003 | Bargoot et al. | |
| 2006/0171857 A1* | 8/2006 | Stead | G01N 1/312 422/400 |
| 2010/0135861 A1* | 6/2010 | Sage | G02B 21/34 422/400 |
| 2014/0037515 A1* | 2/2014 | Charles | B01L 3/502715 422/502 |
| 2015/0253225 A1* | 9/2015 | Ng | G01N 1/31 422/536 |
| 2016/0282373 A1* | 9/2016 | Iqbal | G01N 35/1065 |

OTHER PUBLICATIONS

International Search Report for PCT/AU2018/050875 dated Sep. 25, 2018 [PCT/ISA/210].
Written Opinion for PCT/AU2018/050875 dated Sep. 25, 2018 [PCT/ISA/237].
Office Action dated May 17, 2022 from the Japanese Patent Office in JP Application No. 2020-501116.
Office Action dated Nov. 10, 2022 from the China National Intellectual Property Office in CN Application No. 201880040275.4.
Office Action dated Nov. 15, 2022 from the Japanese Patent Office in JP Application No. 2020- 501116.
Office Action dated Mar. 3, 2023 in Australian Application No. 2018317943.
Communication dated Mar. 3, 2023 in European Application No. 18 846 726.0.

* cited by examiner

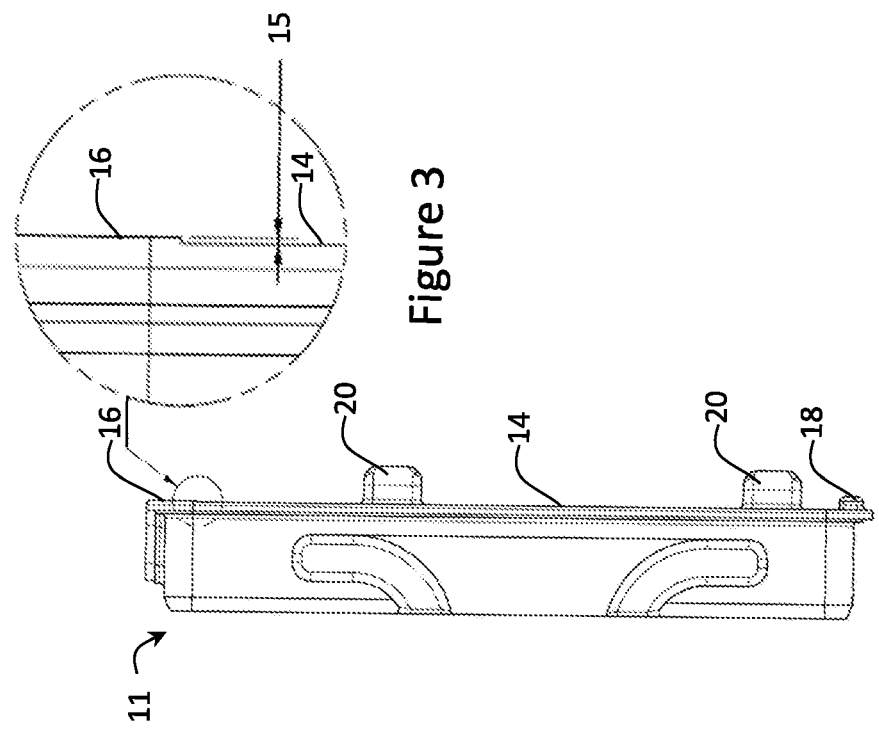
Figure 3
Figure 2
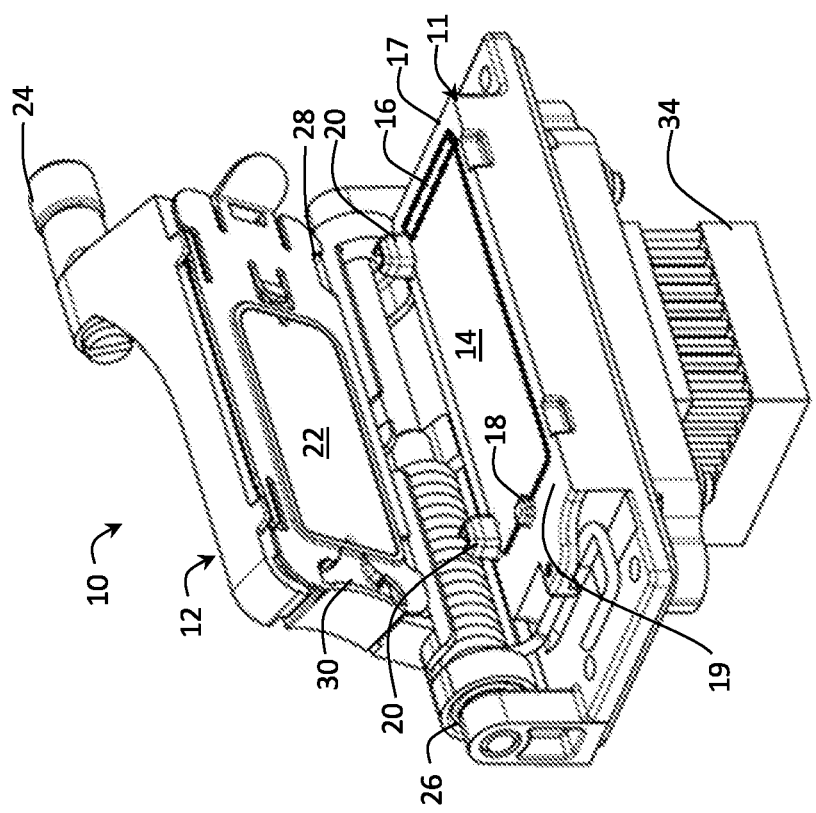
Figure 1

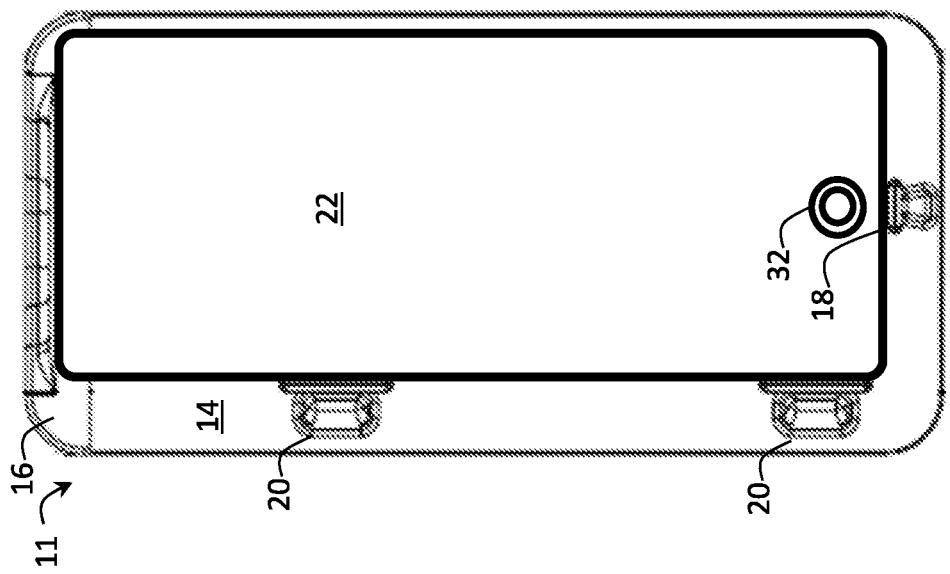
Figure 6
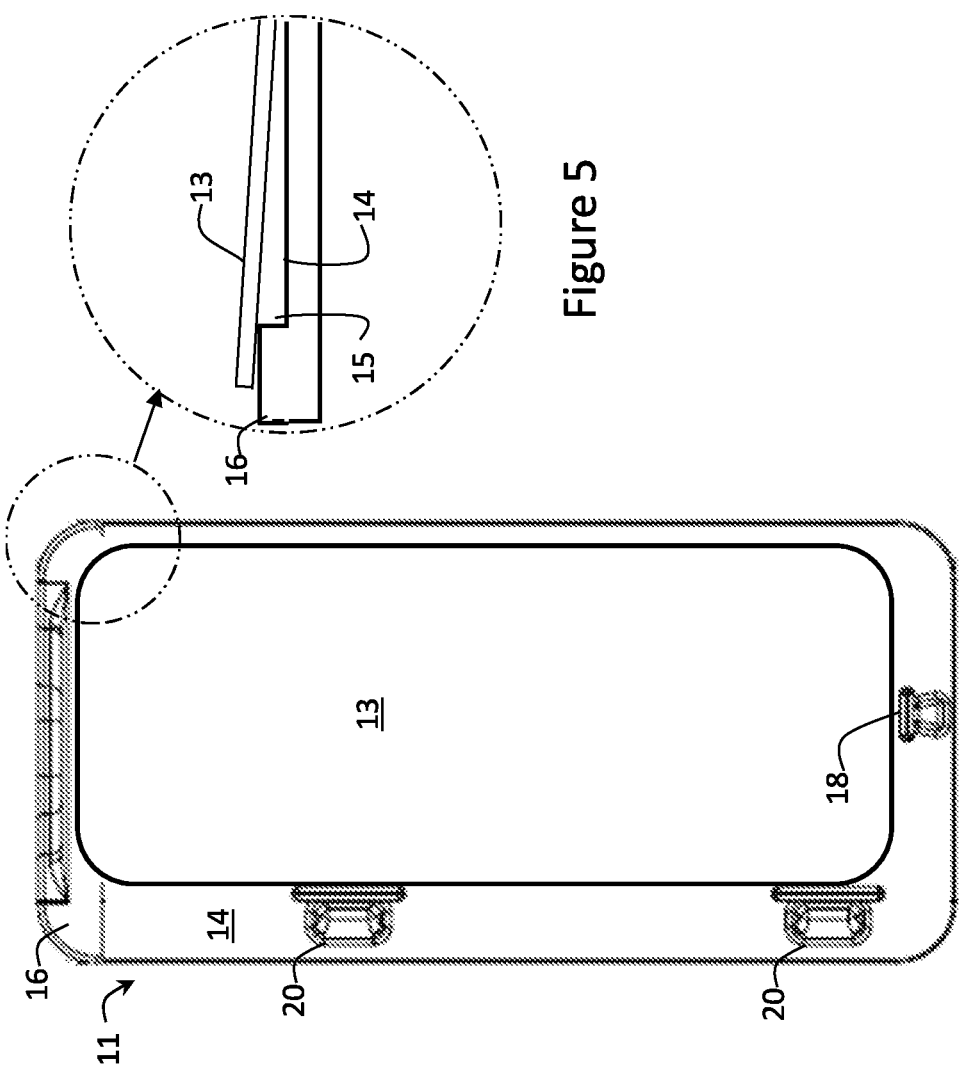
Figure 5
Figure 4

SAMPLE PROCESSING ASSEMBLY

CROSS REFERENCE TO RELATED APPLICATIONS

This application is a National Stage of International Application No. PCT/AU2018/050875 filed Aug. 17, 2018, claiming priority from Australian Provisional Patent Application No. 2017903307 filed on 17 Aug. 2017, the contents of which are to be taken as incorporated herein by this reference.

TECHNICAL FIELD

The present invention relates to a sample processing assembly, typically for use in a laboratory instrument, to facilitate automated staining of samples on substrates. In particular, but not exclusively, the sample processing assembly includes a mounting surface for the substrate with a step to provide for an air gap between the mounting surface and the substrate. The present invention also relates to an instrument for treatment of a sample on a substrate including at least one sample processing assembly as disclosed herein, and a method of placing a substrate in a sample processing assembly.

BACKGROUND OF INVENTION

Immunohistochemical staining and in situ nucleic acid analysis are tools used in histological diagnosis and the study of tissue morphology. Immunohistochemical staining relies on the specific binding affinity of antibodies with epitopes in tissue samples, and the increasing availability of antibodies which bind specifically with unique epitopes present only in certain types of diseased cellular tissue. Immunohistochemical staining involves a series of treatment steps conducted on a tissue sample (typically a section) mounted on a substrate (e.g. glass slide) to highlight, by selective staining, certain morphological indicators of disease states.

Typical treatment steps include pretreatment of the tissue sample to reduce non-specific binding, antibody treatment and incubation, enzyme labelled secondary antibody treatment and incubation, substrate reaction with the enzyme to produce a fluorophore or chromophore highlighting areas of the tissue sample having epitopes binding with the antibody, counterstaining, and the like. Between each treatment step, the tissue sample must be rinsed to remove unreacted residual reagent from the prior step. Most treatment steps involve a period of incubation typically conducted at ambient temperature of around 25° C. up to around 40° C., while cell conditioning steps are typically conducted at somewhat higher temperatures (e.g. 90° C. to 100° C.). In-situ DNA analysis relies upon the specific binding affinity of probes (DNA binding proteins) with unique nucleotide sequences in cell or tissue samples and similarly involves a series of process steps, with a variety of reagents and process temperature requirements. Some specific reactions involve temperatures up to 120° C. to 130° C.

Instrumentation and automated sample processing systems exist for automating some steps in the treatment processes discussed above. Existing systems include at least one sample processing assembly for treating a sample on a substrate. This assembly includes a mounting surface for receiving a substrate when the assembly is in an open positon and a movable cover member that, when the assembly is moved to a closed position, the cover member covers the mounting surface and the substrate to form a reaction chamber for processing the sample.

It will be appreciated that, in these existing automated sample processing systems, the substrate is required to be placed on the mounting surface in a precise location when the assembly is in the open position so that the cover member can suitably cover the substrate and the mounting surface to form the reaction chamber. The substrate, however, may migrate across the mounting surface after it has been placed on the mounting surface which can interfere with the forming of the reaction chamber. Also, after the staining process has occurred, the substrate is to be removed from the sample processing assembly. In some instances, the substrate can become stuck to the mounting surface, especially when the mounting surface is in communication with a heater, making it difficult for the substrate to be removed from the sample processing assembly.

The discussion of the background to the invention included herein including reference to documents, acts, materials, devices, articles and the like is intended to explain the context of the present invention. This is not to be taken as an admission or a suggestion that any of the material referred to was published, known or part of the common general knowledge as at the priority date of any of the claims.

SUMMARY OF INVENTION

Viewed from one aspect, the present invention provides a sample processing assembly for treatment of a sample on a substrate, the assembly including: a mounting surface for the substrate; and a cover member, the cover member being movable between an open position and a substantially closed position, wherein, when the substrate is placed in the assembly and the cover member is in the substantially closed position, a reaction chamber is formed for processing the sample between the cover member and the substrate, and wherein the mounting surface provides for an air gap between the substrate and the mounting surface.

In some embodiments, the mounting surface includes a step to provide for the air gap between the substrate and the mounting surface.

The air gap reduces the contact area between the substrate and the mounting surface. In use, this reduced contact area may prevent the substrate from gliding or migrating on top of the mounting surface after it has been placed on the mounting surface and before the cover member is moved to the closed position to form the reaction chamber. Substrate gliding or migration on top of the mounting surface can occur at any time before the cover member is moved to the closed position. However, substrate gliding or migration may particularly occur when an air or liquid bubble is formed between a portion of the substrate and the mounting surface.

In some embodiments, the mounting surface extends longitudinally between a first end and a second opposed end, and the step is located adjacent the first end. In use, the substrate placed on the mounting surface may also extend longitudinally between the first end and the second opposed end, and at least partially over the step located adjacent the first end.

In some embodiments, the step has a height relative to the mounting surface to provide for the air gap between the substrate and the mounting surface, and the height of the step permits the substrate to be flexed into substantial contact with the mounting surface when the cover member is in the substantially closed position. For example, the height of the step may be between 0.08 mm to 0.12 mm, and preferably is 0.1 mm. In some embodiments, the substrate is an elongate substrate, such as a pathology slide made of glass, having inherent flexibility to be flexed into substantial contact with the mounting surface when the cover member is in the substantially closed position. In the example, the height of the step is selected to allow the slide to be flexed into substantial contact with the mounting surface without breaking the slide.

In some embodiments, the step is configured to move between a first position providing the air gap between the substrate and the mounting surface and a second position substantially parallel to the mounting surface. Further, the step may be biased by a biasing means towards the first position. For example, the step may be biased by a spring towards the first position. The step may be biased to provide the air gap when the cover member is in the open position and permit the substrate to be in substantial contact with the mounting surface when the cover member is in the substantially closed position.

In some embodiments, the step is a raised projection from the mounting surface. It will be appreciated by those persons skilled in the art that the step can be dimensioned between the entire of width of the mounting surface at the first end and a raised point on the mounting surface at the first end, provided that the air gap is provided between the substrate and the mounting surface.

In some embodiments, the mounting surface is in communication with a heater to heat the reaction chamber formed between the cover member and the substrate. The heater may be operable to vary the temperature within the reaction chamber. As mentioned, the substrate may become stuck to the mounting surface, especially when the heater is used. The air gap, however, may enable the substrate to be more readily removed from the sample processing assembly and minimise being stuck.

In some embodiments, the mounting surface includes at least one guide adjacent the second end configured to limit movement of the substrate in at least a first direction during placement of the substrate in the assembly. The at least one guide of the mounting surface may be at least one first guide. Ideally, the at least one first guide is a protrusion on the mounting surface although it may take other forms. Preferably, there is also provided at least one second guide on the mounting surface. A second guide may limit movement of the substrate in a second direction which is different from the first direction. Typically the first and second directions are arranged orthogonally. Ideally, the at least one second guide is a protrusion which is shaped to cooperate with a corresponding notch in a cover member. In use, the at least one second guide and corresponding notch in the cover member may cooperate for optimal alignment of the cover member.

In some embodiments, the cover member extends longitudinally and has a fluid inlet port at one end of the cover member adjacent the second end of the mounting surface. The fluid inlet port, in use, may permit fluid transfer between a fluid source associated with the sample processing assembly and the reaction chamber. Also, the cover member may extend longitudinally over a portion of the substrate where the substrate is flexed to be into substantial contact with the mounting surface.

In some embodiments, the cover member has a first side, a second side opposing the first side, and a void on the first side forming the reaction chamber when the cover member contacts the substrate. In some embodiments, the cover member is configured for releasable engagement with a closure body of the sample processing assembly which has at least one notch shaped to cooperate with a corresponding protrusion on the mounting surface of the sample processing assembly, such that when in use, the notch and protrusion guide the cover member into position in the assembly to form the reaction chamber with the substrate. Preferably, the cover member includes a compressible member on the first side configured to form a seal around the reaction chamber when in use; the compressible member material further extending around the fluid inlet port in the cover member and forming a sealing annulus around an opening of fluid the fluid inlet port on the cover member. In one embodiment, the void is defined by the compressible member. In another embodiment, the void is defined, at least in part, by a void portion or cavity in the cover member first side.

In some embodiments, the substrate with which the cover member forms a reaction chamber may be a slide, such as a histology slide (e.g. for sample treatment steps), or the mounting surface of the assembly (e.g. for a cover member wash phase). It is preferred that the cover member is manufactured, at least in part, from a compliant material to form the reaction chamber. The cover member may therefore be manufactured or coated at least in part from a material selected from the group including: Polycarbonate, Polyoxymethylene (acetal), Polyether ether ketone (PEEK), polyethylenes including high density polyethylene (HDPE) and ultra-high molecular weight polyethylene (UHMW-PE), Teflons including Teflon PE and Polypropylenes including Fluorinated ethylene propylene (FEP), and Cyclic Olefin Copolymers (COC).

In some embodiments, the cover member includes a reservoir configured to receive and store a quantity of fluid sufficient for a plurality of sample processing steps. The fluid inlet port may provide for fluid ingress from the reservoir into the reaction chamber. The reservoir may be in communication with the fluid inlet port and may include one or more inclined internal walls configured to direct fluid into the first fluid port.

In some embodiments, the assembly further includes a closure body configured to retain the cover member, and the closure body and the cover member being moveable between the open position and the substantially closed positon. Preferably, the assembly includes closing biasing means for applying a biasing force such that the closure body is biased in the substantially closed position. The height of the step on the mounting surface may be selected in this embodiment to not prevent the closing biasing means from biasing the closure body towards the substantially closed position and the reaction chamber being formed. In the alternative embodiment described above, the step may be biased and can be moved to the second position substantially parallel to the mounting surface against the bias when the reaction chamber is formed.

Viewed from another aspect, the present invention provides a sample processing assembly for treatment of a sample on a substrate, the assembly including: a mounting surface for the substrate; and a cover member, the cover member being movable between an open position and a substantially closed position, wherein, when the substrate is placed in the assembly and the cover member is in the substantially closed position, a reaction chamber is formed for processing the sample between the cover member and the substrate, and wherein the mounting surface includes a support portion for supporting the substrate in a first orientation relative to the mounting surface.

In some embodiments, the support portion provides for an air gap between the substrate and the mounting surface when the substrate is supported in the first orientation. The air gap reduces the contact area between the substrate and the mounting surface. In use, this reduced contact area may prevent the substrate from gliding or migrating on top of the mounting surface after it has been placed on the mounting surface and before the cover member is moved to the closed position to form the reaction chamber.

In some embodiments, the mounting surface extends longitudinally between a first end and a second opposed end, and the support portion is located adjacent the first end. In use, the substrate placed on the mounting surface may also extend longitudinally between the first end and the second opposed end, at least partially over the support portion located adjacent the first end. The support portion may support the substrate in the first orientation at an angle relative to the mounting surface. In other embodiments, the support portion may be located anywhere between the first end and the second opposed end of the mounting surface.

In some embodiments, the support portion is shaped such that the substrate is supported in the first orientation at a height relative to the mounting surface. The height of the support portion may provide for the air gap between the substrate and the mounting surface due to the raised orientation of the substrate relative to the mounting surface. The support portion may include a projection. Preferably, the support portion includes a raised projection from the mounting surface to support the substrate at a height relative to the mounting surface in the first orientation. In some embodiments, the support portion includes a step. Additionally/alternatively, the support portion may include one or more of a protuberance, a ridge or a ledge, to name a few. It would be appreciated by those persons skilled in the art that the support portion can include any feature or shape such that the substrate is supported in the first orientation relative to the mounting surface, preferably at a height relative to the mounting surface.

In some embodiments, the support portion is further configured to support the substrate in a second orientation substantially parallel to the mounting surface. The substrate may be in substantial contact with the mounting surface in the second orientation. The height of the support portion may permit the substrate to be flexed into substrate contact with the mounting surface when the cover member is in the substantially closed position. For example, the support portion may have a height between 0.08 mm to 0.12 mm, and preferably, of 0.1 mm. The height of the support portion may be selected to allow the slide to be flexed into substantial contact with the mounting surface without breaking the slide.

In some embodiments, the support portion is configured to move between a first position providing the first orientation of the substrate and a second position providing the second orientation of the substrate. Further, the support portion may be biased by a biasing means towards the first position. The support portion may be biased to provide the first orientation, and preferably the air gap, when the cover member is in the open position and permit the substrate to be in substantial contact with the mounting surface when the cover member is in the substantially closed position. The support portion may be depressible or compressible in order to move between the first position and the second position. For example, the support portion may adopt the first position in an expanded configuration and move to the second position in a compressed or retracted configuration. The support portion may include an elastic element, such as a spring, or alternatively, include compressible material, in order to provide movement from the first position and the second position.

In some embodiments, the mounting surface is in communication with a heater to heat the reaction chamber formed between the cover member and the substrate. The mounting surface may also include at least one guide adjacent the second end configured to limit movement of the substrate in at least a first direction during placement of the substrate in the assembly.

In some embodiments, the cover member extends longitudinally and has a fluid inlet port at one end of the cover member adjacent the second end of the mounting surface. In use, the fluid inlet port may permit fluid transfer between a fluid source associated with the sample processing assembly and the reaction chamber. Also, the cover member may extend longitudinally over a portion of the substrate where the substrate is flexed to be into substantial contact with the mounting surface.

In some embodiments, the assembly further includes a closure body configured to retain the cover member, and the closure body and the cover member are moveable between the open position and the substantially closed position. Preferably, the assembly includes closing biasing means for applying a biasing force such that the closure body is biased in the substantially closed position. The height of the support portion of the mounting surface may be selected in this embodiment to not prevent the closing biasing means from biasing the closure body towards the substantially closed position and the reaction chamber being formed. In the alternative embodiment described above, the support portion may be biased and can be moved to the second position substantially parallel to the mounting surface against the bias when the reaction chamber is formed.

Viewed from another aspect, the present invention provides an instrument for treatment of a sample on a substrate, the instrument including at least one sample processing assembly as disclosed herein.

The at least one sample processing assembly may have one or more of the features of the embodiments as disclosed herein. Preferably, the instrument is configured for treatment of a biological sample on the substrate in the sample processing assembly. Ideally, the instrument includes a plurality of sample processing assemblies as disclosed herein. The instrument may be configured to facilitate automated staining of samples on substrates in the sample processing assemblies.

In some embodiments, the instrument includes at least one robotic head which opens and closes the at least one sample processing assembly to move the cover member between the open position and the substantially closed position. The at least one robotic head may also dispense reagent through a probe into the at least one sample processing assembly. The at least one robotic head may be a first robotic head of the instrument. The instrument may also include a second robotic head for placing the substrate on the mounting surface for processing in the sample processing assembly, and removing the substrate from the mounting surface once the processing is complete. The first and second robotic heads of the instrument may receive instructions from a controller forming part of the instrument.

Viewed from another aspect, the present invention provides a method of placing a substrate in a sample processing assembly, the method including the steps of: placing the substrate on a mounting surface of the sample processing assembly such that an air gap is provided between the substrate and the mounting surface; and moving a cover member of the sample processing assembly from an open position to a substantially closed position.

In some embodiments, placing the substrate on the mounting surface includes the step of placing the substrate at least partially over a step of the mounting surface to provide the air gap between the substrate and the mounting surface.

In some embodiments, moving the cover member includes the step of moving the step of the mounting surface from a first position providing the air gap bereen the substrate and the mounting surface to a second position substantially parallel to the mounting surface. In some embodiments, moving the step of the mounting surface from the first position to the second position flexes the substrate into substantial contact with the mounting surface.

In some embodiments, the sample processing assembly of the method may have one or more of the features of the embodiments as disclosed herein. In some embodiments, the method steps may be performed by an instrument as disclosed herein. The instrument may include one or more robotic heads controlled by a controller of the instrument for performing the method steps.

BRIEF DESCRIPTION OF DRAWINGS

The present invention will now be described in greater detail with reference to the accompanying drawings in which like features are represented by like numerals. It is to be understood that the embodiments shown are examples only and are not to be taken as limiting the scope of the invention as defined in the claims appended hereto.

FIG. 1 is an isometric view of a sample processing assembly in a substantially open position, according to an embodiment of the invention.

FIG. 2 is a side view of a mount of the sample processing assembly of FIG. 1.

FIG. 3 is a zoomed portion of the side view of the mount of FIG. 2.

FIG. 4 is a top view of the mount of the sample processing assembly of FIG. 1, showing a substrate on a mounting surface of the mount.

FIG. 5 is a zoomed portion of the top view of the mount of FIG. 4.

FIG. 6 is a top view of the mount of the sample processing assembly of FIG. 1, showing a cover member on the substrate.

DETAILED DESCRIPTION

Figure 7:
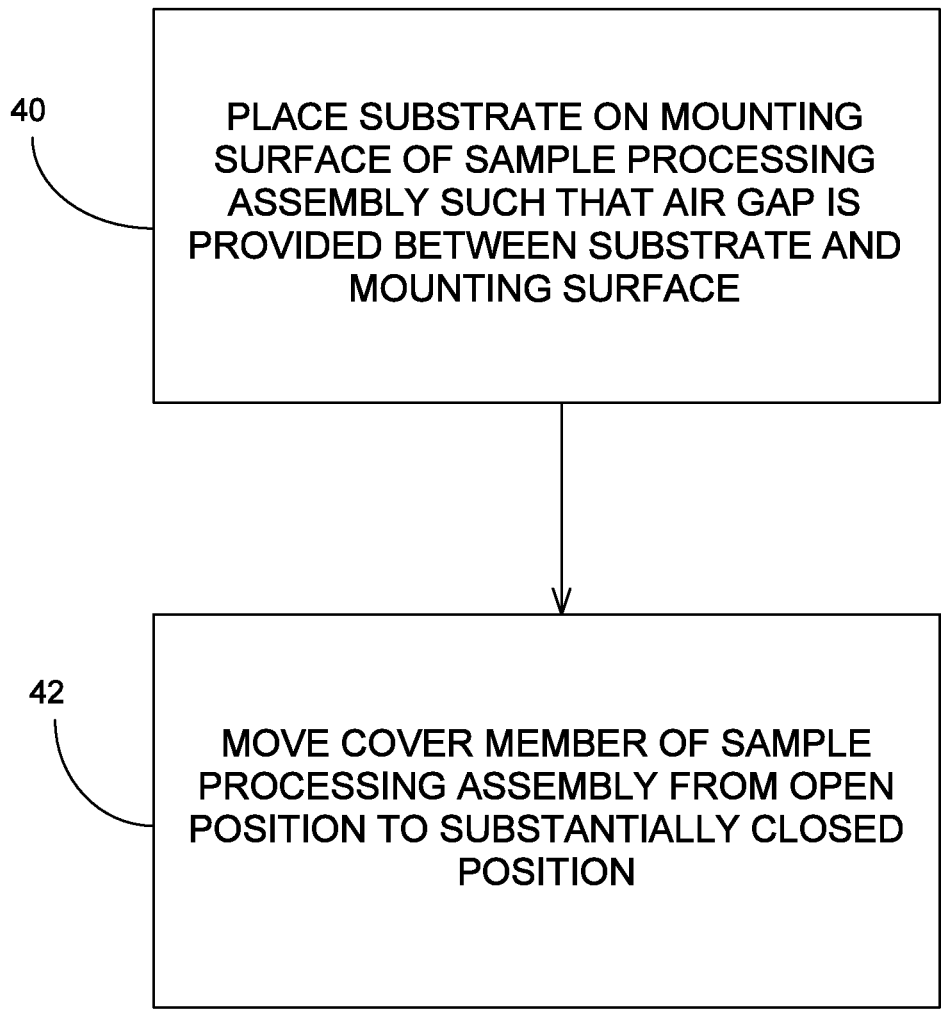
FIG. 7 is a flow chart illustrating steps in a method of placing a substrate in a sample processing assembly, according to an embodiment of the invention.

Embodiments of the invention are discussed herein by reference to the drawings which are not to scale and are intended merely to assist with explanation of the invention.

In the embodiment shown in FIG. 1, there is shown a schematic illustration of a sample processing assembly 10 according to an embodiment of the invention. The assembly 10 is for processing a sample on a substrate and may be provided as part of an instrument (not shown), which has a robotic head which opens and closes a closure body 12 of the assembly 10, and dispenses reagent through a probe on the robotic head into the assembly 10 in accordance with instructions received from a controller forming part of the instrument. Ideally, the instrument contains a plurality of sample processing assemblies 10 of the kind described and claimed herein, such that a number of individual samples may be processed by the instrument in an automated fashion with little or no manual intervention. Such an instrument may employ a single robotic head for dispensing reagents, or a second or subsequent robot may be involved.

Typically, the instrument houses containers of reagent of various types that are required to complete the processing steps controlled by the controller. A robotic dispensing head is coupled to the containers by a fluid distribution system (tubing between the containers and the head) and dispenses fluid into the sample processing assembly 10 using a probe. The instrument may include one or more of the features as described in International Publication Nos. WO 2013/071358 and WO 2013/071357 in the name of the present Applicant, the entire contents of which are incorporated herein by reference.

FIG. 1 shows the assembly 10 in a substantially open position with a base or mount 11 and a closure body 12. The assembly 10 includes a mounting surface 14 for a substrate 13 (shown in FIG. 4) and a cover member 22. Preferably, the base or mount 11 includes the mounting surface 14 as shown in FIG. 1. The cover member 22 is releasably retained by the closure body 12 and movable between an open position, relative to the mounting surface 14, and a substantially closed position relative to the mounting surface 14. FIG. 1 shows the closure body 12 and the cover member 22 in the open position and FIG. 6 shows the cover member 22 only in the closed positon.

In use of the assembly 10, a substrate is placed in the assembly 10 while the cover member 22 is in the open position, as shown in FIG. 4. The closure body 12 and the cover member 22 are then moved to the closed positon, and a reaction chamber is formed for processing the sample between the cover member 22 and the substrate 13.

The mounting surface 14 is provided to support the substrate 13, such as a slide onto which a sample has been mounted for processing using the assembly 10. When the substrate 13 is placed on the mounting surface 14 and the cover member 22 is in the open position, an air gap 15 is provided, shown most clearly in the enlarged views of FIGS. 3 and 5, between the substrate 13 and the mounting surface 14. As described, the air gap 15 prevents the slide 13 from migrating on the mounting surface 14 before the closure body 12 is moved to the closed position on the substrate 13.

To provide the air gap 15, the mounting surface 14 includes a step 16 between the substrate 13 and the mounting surface 14. The step 16 is located at a first end 17 of the mounting surface 14, which extends longitudinally between the first end 17 and a second, opposed end 19. In use, the substrate 13 is placed on the mounting surface 14 and extends longitudinally between the first end 17 and the second opposed end 19, and at least partially over the step 16 located adjacent the first end 17, as shown in FIG. 4.

As mentioned, the step 16 has a height selected relative to the mounting surface 14 to permit the substrate 13 to be flexed into substantial contact with the mounting surface 14 when the cover member 22 is in the substantially closed position. With the step 16 located adjacent the first end 17 of the mounting surface 14, it can be seen most clearly in FIGS. 2 and 4 that the majority of the substrate 13, generally made of glass, would be flexed to be in contact with the mounting surface 14. It would therefore be understood that, with reference to FIG. 1, in use, the portion of the substrate 13 forming the reaction chamber with the cover member 22 is substantially in contact with the mounting surface 14 and not over the air gap 15 at the first end 17 of the mounting surface 14. Also, as mentioned, the height of the step 16 is between 0.08 mm to 0.12 mm, and is preferably 0.1 mm.

In use, the closure body 12 of the embodiment shown in FIG. 1 pivots open and closed. Ideally, the sample processing assembly 10 has a bearing surface 24 on closure body 12 that may be contacted by part of the robotic head to actively open the closure body 12 which may be normally biased closed. Typically, the bearing surface 24 includes a cam roller which protrudes from the closure body 12 and is contacted by a contact member of a robotic head to pivot the closure body 12 from the closed to open position. It is to be understood, however, that the direction of opening need not involve pivoting or pivoting alone; separation of the closure body 12 from the mounting surface 14 by lifting the closure body 12 or lowering the mounting surface 14 is also contemplated, as well as relative sliding of the two parts to accommodate placement therebetween of the substrate 13 carrying a sample for processing. Ideally, the substrate 13 is placed in the open sample processing assembly 10 using a robotic head, which conveys the substrate 13 with sample into the assembly 10 in an automated fashion, under the control of a controller. This may involve the robotic head controlling movement of the substrate 13 (e.g. by sliding on the mounting surface 14 and into position) ready for closure body 12 to be closed and the reaction chamber formed. The robotic head may manipulate the substrate 13 using, for example, grippers, a vacuum or any other suitable means to hold/grasp the substrate 13 for placement within the assembly 10.

To assist with positioning, at least one first guide 18 is provided in the form of a protrusion or post on the mounting surface 14 to limit movement of the substrate 13 in at least a first direction. Thus, when the substrate 13 is placed using say the robotic head, it slides across mounting surface 14 until it reaches the first guide 18 which provides a datum point limiting further movement. One or more further first guides may be provided to limit direction of the substrate 13 in the same direction, if necessary.

In the embodiment shown in the Figures, two spaced apart second guides 20 are also provided, in the form of protrusions or posts on the mounting surface 14, to limit movement of the substrate 13 in a second direction, perpendicular to the first direction. It is to be understood that the substrate 13 may be moved in the first direction and the second direction in any order, and positioning may be iterative. The second guides 20 provide further datum points to optimise placement of the substrate 13 within the sample processing assembly 10. In the embodiment, the second guides 20 are shaped to cooperate with corresponding notches 28 in the closure body 12. In this arrangement, the second guides 20 and corresponding notches 28, cooperate during closing of the closure body 12 for optimal alignment of the cover member 22 over the substrate 13 to form the reaction chamber.

The reaction chamber thus formed between the substrate 13 and the cover member 22 when the assembly 10 is in a substantially closed position protects tissue samples on the surface of the substrate 13 by minimising exposure to air; a drawback which has led to drying out of samples in the past. In some prior art instruments sample drying has necessitated regular rehydration during processing. Further, FIG. 1 shows biasing means 26, which biases closure body 12 toward a substantially closed position, so the reaction chamber is formed.

FIG. 6 illustrates an embodiment of the cover member 22 of the assembly 10 in the closed position over the substrate 13. The cover member 22 shown in FIG. 6 has a first side facing the substrate 13 and a second side opposing the first side. A void (not shown) on the first side of the cover member 22 forms a reaction chamber of 20 µl to 500 µl in volume, more preferably 50 µl to 300 µl and more preferably still, 100 µl to 200 µl in volume, when the cover member 22 contacts the substrate 13 in the assembly 10. The cover member 22, in use, forms a sealing surface with the substrate 13. The cover member 22 includes a fluid flow port 30, shown in FIG. 1, for receiving reagent into the reaction chamber which is provided toward one end of the cover member 22. Ideally, the fluid flow port 30 is filled from a reservoir 32, shown in FIG. 6, located adjacent the second end 19 of the mounting surface 14, into which a volume of reagent may be dispensed, e.g. by a fluid dispenser on a robotic head of an instrument. Ideally, the reservoir 32 has at least one inclined wall for guiding the reagent toward the fluid flow port 30 and into the reaction chamber.

Reagent may fill the reaction chamber by gravity filling from reservoir 32. The level of fluid may be controlled hydrostatically. This ensures the reservoir 32 contains enough reagent/wash solution to cover the sample on the substrate 13 or, in the case of washing, ideally to fill the reaction chamber. Fluid may be held in the reservoir 32 for later release into the reaction chamber by closing the downstream fluid path anywhere after a second fluid flow port (not shown) of the cover member 22.

Referring back to FIG. 1, the sample processing assembly 10, has a heater 34 coupled with the mounting surface 14. The heater 34 is operable, preferably under control of the controller of the instrument, to vary the temperature within the reaction chamber. This is necessary for some processing steps and individual control of the heater, for heating and preferably cooling, gives rise to enhanced processing (e.g. staining) and improved scheduling capabilities on board the instrument in which there is a plurality of sample processing assemblies 10 which each may be conducting entirely different sample processing assays.

In use, the portion of the substrate 13 forming the reaction chamber is flexed to be in substantial contact with the mounting surface 14, when the cover member 22 is in the closed position, so that that portion of the substrate 13 is evenly subjected to heat from the heater 34. As mentioned, however, the substrate 13 may become stuck to the mounting surface 14 when the heater is used so the air gap 15 enables the substrate 13 to be more readily removed from the mounting surface 14 without affecting the consistency of the communication of heat from the heater 34.

In a preferred embodiment of the present invention, there is also provided an instrument for treatment of a sample on a substrate 13 (not shown). The instrument includes at least one sample processing assembly 10 as disclosed herein. The instrument has been described with respect to the sample processing assembly 10 of FIGS. 1 to 6. Preferably, the instrument is configured for treatment of a biological sample on the substrate 13 in the sample processing assembly 10. Ideally, the instrument includes a plurality of sample processing assemblies 10. The instrument may be configured to facilitate automated staining of samples on substrates 13 in the sample processing assemblies 10. The instrument may include one or more of the features as described in International Publication Nos. WO 2013/071358 and WO 2013/071357 in the name of the present Applicant, the entire contents of which are incorporated herein by reference.

In another preferred embodiment of the present invention, there is provided a method of placing a substrate 13 in a sample processing assembly 10 as illustrated in the flow chart of FIG. 7. The method includes the step 40 of placing the substrate 13 on a mounting surface 14 of the sample processing assembly 10 such that an air gap 15 is provided between the substrate 13 and the mounting surface. The method also includes the step 42 of moving a cover member 22 of the sample processing assembly 10 from an open position to a substantially closed position.

Placing the substrate 13 on the mounting surface 14 may include the step of placing the substrate 13 at least partially over a step 16 of the mounting surface 14 to provide the air gap 15 between the substrate 13 and the mounting surface 14 as shown in FIG. 5. The step of moving the cover member 22 may include the step of moving the step 16 of the mounting surface 14 from a first position providing the air gap between the substrate 13 and the mounting surface 14, as shown in FIG. 4, to a second position substantially parallel to the mounting surface 14, as shown in FIG. 6. Moving the step 16 of the mounting surface 14 from the first position to the second position flexes the substrate 13 into substantial contact with the mounting surface 14.

The sample processing assembly 10 may include one or more of the features of embodiments of the sample processing assembly 10 as disclosed herein and described with reference to FIGS. 1 to 6. The steps of the method may be performed by an instrument for treatment of a sample on a substrate 13 as disclosed herein. In some embodiments, the steps of the method may be performed by at least one robotic head of the instrument under control of a controller of the instrument. The robotic head may be configured to move the substrate 13 to and from the mounting surface 14 and to move the cover member 22 between the open position and substantially closed position by contact with the closure body 12 retaining the cover member 22, as disclosed herein with reference to FIGS. 1 to 6.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

It is to be understood that various modifications, additions and/or alterations may be made to the parts previously described without departing from the ambit of the present invention as defined in the claims appended hereto.

It is to be understood that the following claims are provided by way of example only, and are not intended to limit the scope of what may be claimed in any future application. Features may be added to or omitted from the claims at a later date so as to further define or re-define the invention or inventions.

The invention claimed is:

1. A sample processing assembly for treatment of a sample on a substrate, the sample processing assembly comprising:
   a substrate,
   a mounting surface on which the substrate rests, the mounting surface extending between first and second ends which are opposed to each other in a lengthwise direction of the mounting surface, the mounting surface comprising a base portion and a support portion, the support portion being raised relative to and projected from the base portion of the mounting surface; and
   a cover member that covers an entirety of the mounting surface, the cover member being movable between an open position and a substantially closed position, wherein, when the substrate is placed in the assembly and the cover member is in the substantially closed position, a reaction chamber is formed for processing the sample between the cover member and the substrate,
   wherein the mounting surface further comprises at least one guide disposed at the second end, the at least one guide is configured to limit movement of the substrate in at least a first direction during placement of the substrate in the assembly,
   wherein the raised support portion of the mounting surface comprises a step having a height that provides for an air gap to be formed between a portion of the substrate and the mounting surface when the substrate is placed on the mounting surface at least partially over the raised support portion.

2. The sample processing assembly according to claim 1, wherein the mounting surface is in communication with a heater to heat the reaction chamber formed between the cover member and the substrate.

3. The sample processing assembly according to claim 1, wherein the height of the step is between 0.08 mm to 0.12 mm.

4. The sample processing assembly according to claim 1, wherein the cover member extends longitudinally and has a fluid inlet port at one end of the cover member adjacent the second opposed end of the mounting surface.

5. The sample processing assembly according to claim 4, wherein the fluid inlet port permits fluid transfer between a fluid source associated with the sample processing assembly and the reaction chamber.

6. The sample processing assembly according to claim 1, further comprising a closure body configured to retain the cover member, and the closure body and the cover member being moveable between the open position and the substantially closed positon.

7. The sample processing assembly according to claim 1, wherein the step is configured to move between a first position providing the air gap between the substrate and the mounting surface and a second position substantially parallel to the mounting surface.

8. The sample processing assembly according to claim 7, wherein the step is biased by a biasing means towards the first position.

9. The sample processing assembly according to claim 1, wherein the support portion is further configured to support the substrate in a second orientation substantially parallel to the mounting surface.

10. The sample processing assembly according to claim 9, wherein the substrate is in substantial contact with the mounting surface in the second orientation.

11. An instrument for treatment of a sample on a substrate, the instrument comprising at least one sample processing assembly according to claim 1.

* * * * *